Inventor:
Thomas L. Fawick.

Feb. 1, 1938.  T. L. FAWICK  2,107,112
TRANSMISSION
Filed Oct. 9, 1935  4 Sheets-Sheet 2
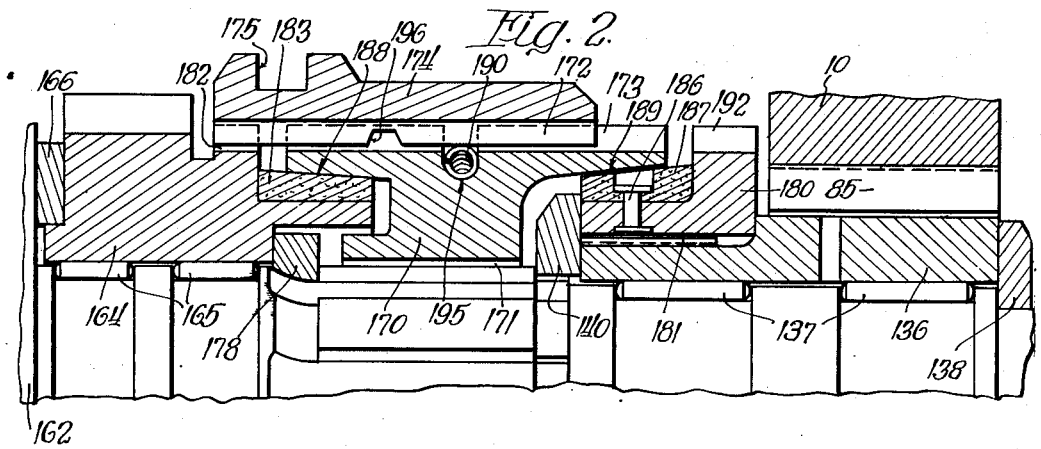
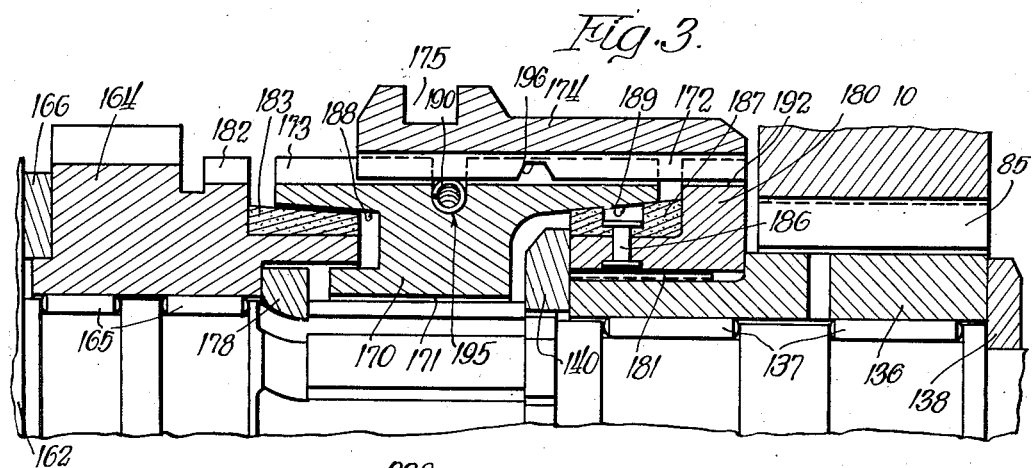
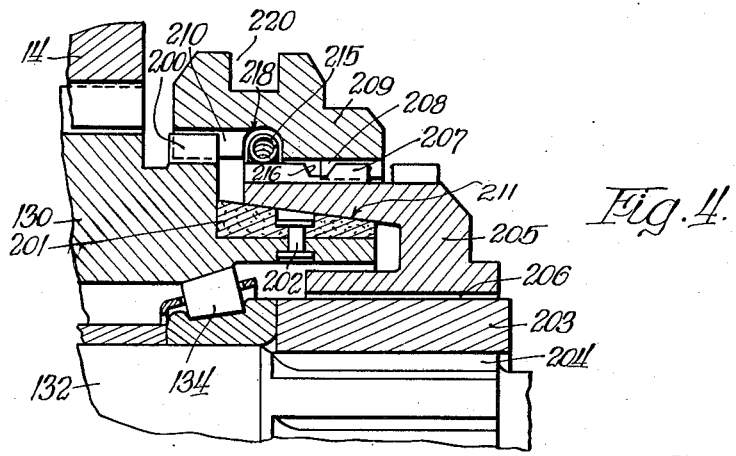
Inventor:
Thomas L. Fawick.

Feb. 1, 1938. T. L. FAWICK 2,107,112
TRANSMISSION
Filed Oct. 9, 1935 4 Sheets-Sheet 3
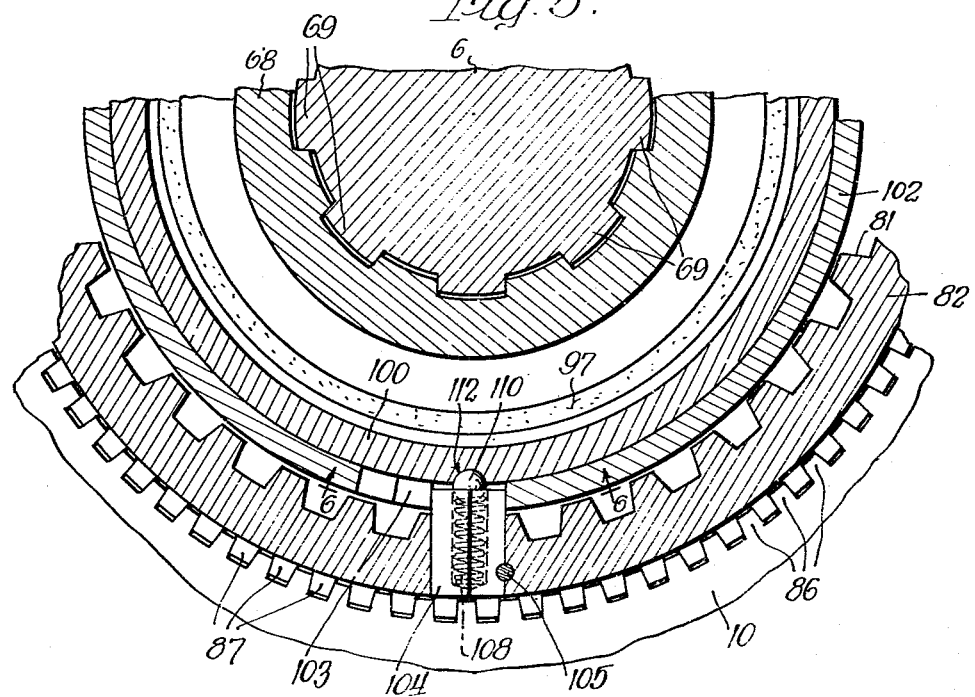
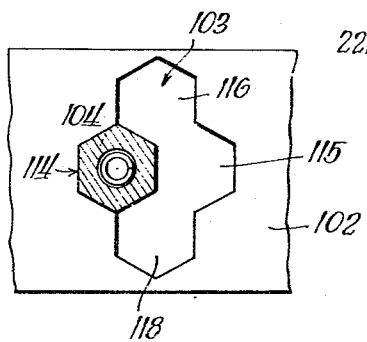
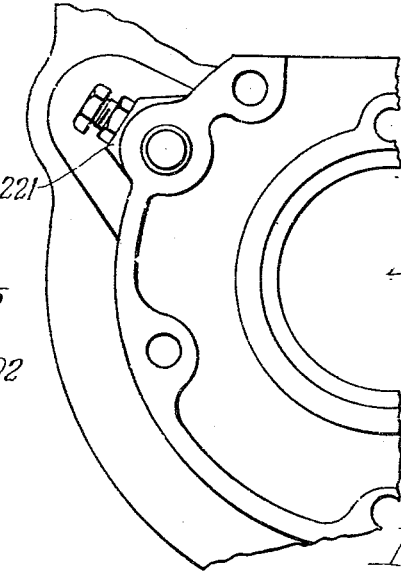
Inventor:
Thomas L. Fawick.

Feb. 1, 1938. T. L. FAWICK 2,107,112
TRANSMISSION
Filed Oct. 9, 1935 4 Sheets-Sheet 4

Inventor:
Thomas L. Fawick.
By Brown, Jackson, Boettcher & Dienner
Attys.

Patented Feb. 1, 1938

2,107,112

UNITED STATES PATENT OFFICE 2,107,112

TRANSMISSION

Thomas L. Fawick, Akron, Ohio, assignor to Borg-Warner Corporation, Chicago, Ill., a corporation of Illinois Application October 9, 1935, Serial No. 44,135

14 Claims. (Cl. 74—332)

My invention relates to transmissions for automotive apparatus.

While the particular device which I shall describe hereinafter in connection with the drawings is a heavy duty transmission adapted for use in motor busses, trucks and the like, it is to be understood that the invention is not limited to such uses but may be employed in all similar work, for example, in connection with automobiles, locomotives and the like, and elsewhere as suitable or desired.

In transmitting the drive from a gasoline engine to the rear wheels or other driving wheels, it has become desirable to provide over-drive gear means.

So far, there have been two general schemes for securing the desired overdrive—first, by means of an overdrive gear device at the rear axle, and second, by means of an overdrive device at the accelerating and reverse gear transmission between the engine shaft and the propeller shaft.

The first scheme above mentioned has the objection of putting additional weight on the rear axle or connected parts. This results in high unsprung weight and is not desirable. The disadvantages of unsprung weight are so well known to engineers skilled in this art that no recapitulation of the same is necessary.

Furthermore, in all types of overdrive devices using conventional gearing, the overdrive is obtained entirely through tooth roll. That is, if they obtained, say, 100% direct drive on third speed, then when shifted to the fourth speed, which we will say is geared up 30%, they would have all or 130% tooth roll. In fact, the tooth roll in such a device would be the same in principle as driving in second gear in the conventional three-speed transmission. This great tooth roll makes it commercially impossible to obtain a quiet gear ratio in overdrive, and, as a result, devices of this sort are noisy and are subject to considerable wear.

The main object of the present invention is to provide a short, compact, heavy duty transmission, complete with four forward speeds, i. e., low, second, direct, and overdrive; also reverse; and to provide a transmission with synchronizing clutches on all ratios. This eliminates the usual necessity of shifting the gear teeth of one gear into mesh with the teeth of another gear and, thereby, the clashing of gear teeth, and enables the use of helical teeth throughout, which usually produce a noiseless or at least an exceptionally quiet transmission.

The present transmission, with overdrive incorporated, is considerably shorter than the conventional transmission having only three speeds where the same gear teeth are used. It is a common fact that the longer a crank case or gear case is made, the more liable it is to weaving or distortion. The use of an overdrive in the transmission has usually added considerable length. According to the present invention, I have taken a standard production three-speed transmission and have built in the overdrive so that it takes engine torque only. The gear case is considerably shorter than the regular three-speed transmission without overdrive. This is due in part to the arrangement of the synchronizing and positive clutches for low and second speeds, and also the synchronizing and positive clutch means for reverse on the countershaft. These clutches are usually on the main through shaft where they must be very large and powerful. By providing the clutches for low, second and reverse on the countershaft, it is possible to make these clutches a great deal smaller and to obtain the same synchronizing and clutching ability as has been obtained with clutches two to three times larger mounted on the main through shaft. Also, by locating the synchronizing and positive clutches for low, second and reverse on the countershaft, these clutches may run in an oil bath in the transmission case, assuring ample lubrication to these clutches.

For the purpose of compactness and reduced overall length, the driving shaft is preferably extended through the internal overdrive gear and through the cooperating external internal gear and reaches over adjacent a direct drive driven member which is disposed in proximity to a clutch part on the external internal gear and a splined driving connection with the driven shaft of the transmission and adjacent a synchronizing and clutching member for connecting the external internal gear or the direct drive driven member to the driven shaft of the transmission selectively, as desired.

The driving shaft extends from the flywheel clutch bearing through the front wall of the transmission case and into proximity to the rear wall of the transmission case, and its rear end is piloted in the forward end of the driven shaft of the transmission. This, with the other features to be hereinafter described, gives great compactness and particularly short over-all length. The driven shaft has improved bearing support.

According to the present invention, the driven shaft has a connected low ratio gear and splines which have permanent and slidable driving engagement with the splines of the synchronizing and clutching ring for direct drive and overdrive, and are disposed inside the external teeth of the low ratio gear.

Another feature resides in the provision of a driven shaft having a connected low ratio gear and provided with a second ratio gear fixed endwise on the driven shaft and against relative rotation with respect thereto.

Another feature resides in supporting the external internal gear by needle-point bearings in line with the internal teeth thereof and with the external teeth as an overhanging load beyond the forward needle-point rollers and, specifically, within the internal drive gear.

Another feature resides in the mounting and arrangement of the first and second ratio and reverse gears on the counter-shaft, and in the arrangement of the synchronizing and clutching rings for these gears; also in the provision of a power take-off for transmitting the drive obliquely, as, for example, from a transversely arranged engine to the rear axle, in combination with the synchronizing and clutching device for the second ratio gear on the countershaft.

It is to be understood that the invention is not limited to the particular combination of ratio gear drives shown in the drawings.

Further features and advantages of the invention will be apparent from the following detailed description taken in connection with the accompanying drawings, in which:

Figure 2 is a fragmentary detail section showing the synchronizing and clutching means for reverse drive and first ratio drive in reverse drive position;

Figure 3 is a view similar to Figure 2 showing the synchronizing and clutching means for reverse drive and first ratio drive in first ratio drive position;

Figure 4 is a fragmentary detail section showing the synchronizing and clutch means for second ratio drive in second ratio drive position;

Figure 5 is a fragmentary section taken on the line 5—5 of Figure 1;

Figure 6 is a fragmentary detail section taken on the line 6—6 of Figure 5;

Figure 7 is a fragmentary view showing the shifting fork for second ratio drive.

Figure 1:
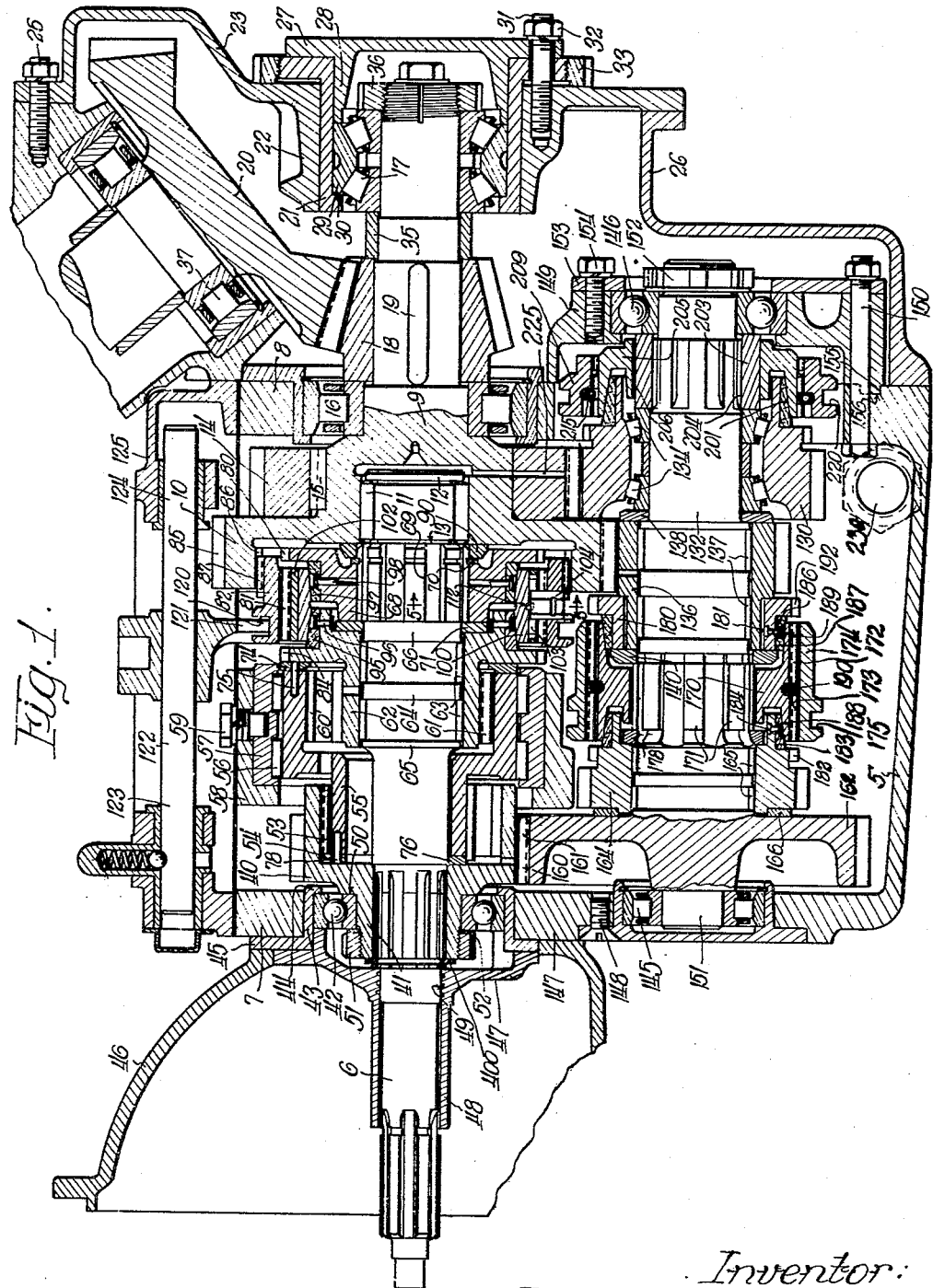
Figure 1 is a longitudinal sectional view of a transmission embodying the present invention.

Referring first to Figures 1 to 7, inclusive, the transmission is housed within a case 5 which is preferably mounted upon the vehicle frame, which frame, in turn, is preferably spring supported upon the rear axle as, for example, in the manner illustrated in my copending application Serial No. 10,769, filed March 13, 1935.

The shaft 6 is the driving shaft and extends from the flywheel clutch bearing through the front wall 7 of the case 5 and into proximity to the rear wall 8 of the case. The rear end of the shaft 6 is piloted in the driven shaft 9 which is in the form of a forging having a tubular portion telescoping the rear end of the shaft 6 and provided with an integral or directly connected low ratio gear 10. Roller bearings provided at 11 between the rear end of the shaft 6 and the shaft 9 are held endwise by a flange 12 and an annular shoulder 13 on the shaft 6. A second ratio gear 14 is held endwise and splined at 15 upon the driven shaft 9 adjacent the gear 10.

The shaft 9 is supported in the rear wall of the main transmission case 5 and adjacent gear 14 by a bearing 16, and rearwardly of the bearing 16 in a roller bearing 17. In the illustrated embodiment of the invention, a bevel driving pinion 18 is splined at 19 upon shaft 9 adjacent bearing 16. A bevel gear 20 meshes with pinion 18 and constitutes a power take-off for transmitting the drive obliquely as, for example, from a transversely arranged engine to the rear axle used in "Greyhound" busses. This diagonal take-off may be omitted within the scope of the present invention, and where it is omitted a universal joint may be applied to the rear end of shaft 9 instead of employing the pinion 18, in which case the shaft 9 may be supported in a manner similar to that shown in my copending application Serial No. 15,764, filed April 11, 1935.

The bearing 17 is carried by a sleeve member 21, which sleeve member is mounted in a hub 22 formed integral with a closure member 23 secured by stud bolts 25 to the rear end of an auxiliary enclosure 26 attached to the rear end of case 5. Cap member 27 has a cylindrical portion 28 which fits into sleeve 21, and the outer race 29 of bearing 17 is held between the inner end of this cylindrical portion and an internal shoulder 30 within sleeve 22. Stud bolts 31, having nuts 32 threaded upon their outer ends, clamp the cap 27 and sleeve 21 in place, and sleeve 21 is adjustable by means of an adjusting ring 33 threaded upon the flange at the outer end of the sleeve and abutting the end of the closure member 23. A sleeve 35 is interposed between pinion 18 and the inner race of bearing 17, and an adjusting nut 36 is threaded upon the rearward end of shaft 9 and into engagement with the inner race of bearing 17. The gear 20 has a shaft supported in a bearing 37.

At the forward end of case 5, internal gear 40 has a hub portion splined at 41 upon shaft 6 within an opening in front wall 7. The gear 40 preferably has pressed fit on the splines 41, and the hub of this gear is supported in a bearing 42. Bearing 42 is carried in a sleeve member 43 having, at its inner end, a flange 44 abutting the inner end of the outer race of bearing 42, and, at its outer end, a flange 45 positioned between the front wall 7 and a casing part 46. Bearing cap 47 has a partially cylindrical portion fitting into the sleeve 43 and abutting the forward end of the outer race of bearing 42, and a tubular portion 48, which extends forwardly along shaft 6 and is preferably provided internally with oil trapping grooves 49. The shoulder 50 on gear 40 is clamped against the inner end of the inner race of bearing 42 by a nut 51 which cooperates with the outer end of the inner race of this bearing, there preferably being a washer 52 interposed therebetween. The mounting of the internal gear 40 in bearing 42 provides perfect alignment for the internal gear teeth, and, with the bearings at 16, 17, provides an admirable support for the parts in which quietness and a perfect pitch line circle are obtained.

The internal gear 40 has internal helical teeth 53 which mesh with external helical teeth 54 on an external internal or composite gear ring 55. The external internal gear 55 is supported externally on needle-point bearings 56 in a cage 57 carried by a retainer ring 58 and held against endwise movement therein by a bolt 59. The external internal gear 55 is thus supported by needle-point bearings 56 in transverse alignment with the internal helical teeth 60, and with the externally toothed portion 54 as an overhanging load beyond the forward needle-point rollers and specifically within the internal drive gear.

It is desirable, from the standpoint of quantity production and maximum quietness of gear operation, to make the internal teeth 53 and the cooperating external teeth 54 helical, and, in fact, all of the gears in the present transmission are preferably helical gears. Straight teeth are, however, contemplated within the scope of the present invention.

The internal helical teeth 60 on composite gear 55 mesh with external helical teeth 61 on a tubular overdrive member 62. This member 62 is mounted within composite gear 55 and needle-point bearings 56 on needle-point bearings 63 on the driving shaft 6. The needle-point bearings 63 comprise two groups of small diameter pins or rollers separated endwise by an external annular rib 64 on shaft 6 and held endwise between this rib and shoulders 65 and 66 on shaft 6.

The driven member 68 for direct drive is splined at 69 on shaft 6 and is held against endwise movement to the right (Figure 1) by a retainer ring 70. A thrust washer 71 is interposed between the forward end of the hub of the direct drive member 68 and the adjacent end of the overdrive member 62 to take the thrust developed between these parts by the helical gear teeth. The washer 71 is placed at this location so that it will have a low relative sliding speed, as for instance, if the internal gear has thirty-two teeth and the meshing spur gear has twenty-eight teeth, it is obvious that the unit will make seven complete revolutions before this washer gains one complete revolution on its sliding thrust face, i. e., this washer turns in accordance with the tooth difference. Interposed between the radially extending portion at the right-hand end of the member 62 and the adjacent end of the external internal gear member 55 is a thrust washer 74 positioned by pins 75, and interposed between the forward end of external internal gear 55 and gear 40 is a thrust washer 76 positioned by pins 78.

The driven member 68 for direct drive is provided peripherally with external clutch teeth 80 for engagement with internal clutch teeth 81 on the synchronizing and clutching ring 82 when this ring is shifted to the right from neutral position, as shown in Figure 1. These same teeth 81 are adapted to be engaged, when the ring 82 is shifted to the left, with external clutch teeth 84 peripherally about the radially extending portion of the overdrive member 62.

The low ratio gear 10, formed integral with shaft 9, has external teeth 85, and internal splines 86 which are in permanent and slidable driving engagement with external splines 87 on the adjacent end of the synchronizing and clutching ring 82. The splined engagement at 86, 87 is inside the external teeth 85 of the low ratio gear 10. A thrust washer 90 is preferably interposed between the ring 70 and the adjacent portion of the gear 10.

The splines 87 are slidable with respect to the splines 86 in shifting member 82, and this slidable splined engagement is of sufficient length for constant engagement when member 82 is in neutral position as shown in Figure 1, as well as when this member is shifted to engage the teeth 81 with the teeth 80 and when said member 82 is shifted in the opposite direction to engage the teeth 81 with the teeth 84. The telescoping of the right-hand end of the member 82 within the external toothed portion of gear 10 makes for exceedingly compact endwise relation of these parts.

Rearwardly of the external clutch teeth 84 the overdrive member 62 is provided with a synchronizing sleeve 95 secured by rivets 96 thereon. Forwardly of the external clutch teeth 80 the direct drive member 68 is provided with a synchronizing sleeve 97 secured thereon by rivets 98. The sleeves 95 and 97 may be formed of cast bronze or other suitable material, and have oppositely conical external frictional clutch or synchronizing surfaces for synchronizing engagement with the oppositely conical synchronizing surfaces on a synchronizing ring 100.

Secured as by means of rivets or the like to the double-cone synchronizing member 100 is a ring 102 which is provided with a plurality of circumferentially spaced openings 103. The clutching ring 82 carries a plurality of studs 104 of hexagonal form as shown in Figures 1 and 6. These studs are held in place in corresponding openings in the clutching ring 82 in any suitable manner, as by means indicated more or less diagrammatically at 105, or in the manner shown in my copending application Serial No. 15,764, filed April 11, 1935. The studs 104 project inwardly from the ring 82 and into the openings 103 in the ring 102.

The clutching ring 82 and synchronizing ring 100 are movable with respect to each other, but spring-pressed detent means is provided for causing the two parts to move together. Such detent means is disposed within the driving studs 104, and comprises a coiled spring 108 disposed in a recess in the associated stud and pressing a steel ball 110 into a groove 112 formed in the outer surface of the synchronizing ring 100. The clutch ring 82 has limited rotative movement and is axially slidable on the part 102 for engaging the teeth 81 with the teeth 80 for direct drive, or with the teeth 84 for internal gear overdrive.

The openings 103 in the ring 102 are especially formed as best shown in Figure 6. These openings are of approximately cruciform shape, and are provided with generally semi-hexagonal intermediate recesses 114 and 115 and laterally disposed recesses 116 and 118 of similar form but somewhat longer. The associated stud 104 is adapted to be disposed in any one of these recesses in the operation of the transmission, as will be apparent from the following description.

The clutching ring 82 has an external groove 120 for engagement with a shifter arm 121 secured upon a shifter rod 122. The shifter rod 122 is journaled at 123 and 124 in the top closure 125 for the case 5, and this rod 122 may be shifted manually or by air, or in any other suitable or desired manner. Movement of the rod 122 to the right shifts the clutch ring 82 to the right, and movement of the rod 122 in the opposite direction shifts the ring 82 in the opposite direction.

In operation, the initial movement of the ring 82, for example, to the left (Figure 1) carries with it, due to the engagement of the spring-pressed ball 110 in the groove 112, the double-cone synchronizing part 100. This causes the left-hand conical surface of this part to engage the conical surface of the ring 95, and as soon as this engagement is effected, the rotation of the overdrive member 62 drags with it the parts 100 and 102 until the stud 104 is engaged by the recess 115. As soon as this is accomplished, further shifting of the ring 82 to the left to engage the clutch teeth 81 with the clutch teeth 84 acts through the engagement of the stud 104 with the inclined surface at the lower side (Figure 6) of the recess 115 to carry with it the parts 100 and 102. Thus, more forcible synchronizing engagement is obtained than of merely the spring-pressed ball 110 were relied upon to press the synchronizing surfaces into engagement.

The same action is provided when the ring 82 is shifted in the opposite direction to engage the internal clutch teeth 81 with the external clutch teeth 80 for direct drive. In other words, when the ring 82 is shifted in one direction, the ball 110 falls into the groove 112 engaging the cone clutch which slides the hexagonal stud 104 into the position shown or into the opposite position, according to the direction of movement. The synchronizing pressure is then accomplished by the angle of the sides of the recess 114 or 115. When the parts are synchronized, the stud 104 slides off the inclined face of the recess 114 or 115, and the positive clutches are engaged.

The second ratio gear 14, which is held endwise on the driven shaft 9 and splined thereto, has permanent driving engagement with the external helical teeth of a gear 130 rotatably mounted on the countershaft 132. The gear 130 is mounted on roller bearings 134, shown as of the "Timken" type, for the purpose of taking care of thrust loads developed by the helical gear teeth. The bearing at 134 makes it unnecessary to use such a bearing on the main shaft. A gear 136, rotatably supported on needle-point bearings 137 on the countershaft 132, has external helical teeth in permanent driving engagement with the teeth 85 of the low ratio gear 10. A washer 138, clamped in place against rotation between the rearward end of the gear 136 and the forward end of the forward inner race member of the bearing 134, takes the end thrust of the low ratio gear on forward driving operation of the vehicle. When the vehicle drives the engine, as for example, going down-hill, the end thrust of the gear 136 is taken by a thrust washer 140.

The countershaft 132 is rotatably supported at its opposite ends in bearings 145 and 146, respectively. The bearing 145 is carried by bearing cap 147 secured at 148 to front wall 7 of case 5. The bearing 146 is carried by a bearing cap 149 secured to rear wall of case 5 by bolts 150. The forward end of shaft 132 is reduced and piloted freely at 151 in bearing 145, and a nut 152 is threaded upon the rear end of shaft 132 and into cooperation with the rear end of the inner race of bearing 146. Bearing cap 149 includes a separate end plate 153 bolted thereto at 154. An integral ring or partially circumferential flange 155 on bearing cap 149 engages in a groove 156 in the rear wall 8 to position or align the cap with the bearing 146 positioned centrally or coaxial with respect to bearing 145.

The internal gear 40 has external helical teeth 160 outside and at least in partial transverse alignment with the internal teeth 53. The external helical teeth 160 have permanent driving engagement with the external helical teeth 161 of a gear 162 integral with or rigidly secured to the countershaft 132. A reverse gear 164 is rotatably mounted upon needle-point bearings 165 on countershaft 132, and a washer 166 is interposed between gear 162 and reverse gear 164 and takes the thrust of the latter gear.

A synchronizing ring 170 for reverse and low ratio drive is splined at 171 for shifting movement upon countershaft 132, and has external teeth 172 in permanent sliding engagement with the internal teeth 173 of the outer positive clutching ring 174. The ring 174 has a groove 175 whereby it may be operated by the same shift lever which shifts the synchronizing and clutching means for second ratio drive, overdrive, and direct drive, or otherwise as suitable or desired. Splined washer 178 is grooved for application over splines 171 and is then turned to interlock with the splines against endwise removal. The synchronizing and clutching member 180 for low ratio drive is separate from and splined upon gear 136 at 181. This permits grinding of the helical teeth of gear 136 without interference by the member 180.

Rearwardly of its external teeth, gear 164 has integral clutch teeth 182, and rearwardly of these teeth is a synchronizing sleeve 183 riveted at 184 upon the tubular rearward end of gear 164. Sleeve 183 has a conical outer surface, and riveted at 186 upon member 180 is a synchronizing sleeve 187 having an oppositely conical outer surface. The sleeves 183 and 187 may be formed of cast bronze or other suitable material. The synchronizing ring 170 has oppositely conical surfaces 188 and 189 for synchronizing engagement with the sleeves 183 and 187, respectively. A coiled garter spring 190 yieldingly connects the synchronizing ring 170 to the clutching ring 174, so that the ring 170 will move yieldingly with the ring 174 and, after the two parts 164, 170 or 180, 170 are synchronized by engagement of the cone clutch surfaces, permits the ring 174 to move on past the ring 170 for engagement of the clutch teeth 173 with the clutch teeth 182 for reverse drive, or engagement of the clutch teeth 173 with clutch teeth 192 on member 180 for low ratio drive. In the neutral position of ring 170 as shown in Figure 1, there may be a slight clearance between the cone clutch surfaces.

The garter spring 190 is preferably made of spring wire. It may be of square section with the sides flared inwardly slightly, as set forth in my copending application, Serial No. 15,764, filed April 11, 1935, so that as the wire is wound to the desired form, the stretch along the outer periphery of the convolutions thereof will bring the section of the wire to substantially square or rectangular form. The turns of the spring may be wound relatively close together, and the ends of the garter spring 190 are suitably joined together. This spring encircles the synchronizing ring 170 and lies in an annular groove 195 formed about the teeth 172. The clutching ring 174 has an internal groove 196 which, when registered with groove 195, is adapted to receive the outer portion of the garter spring 190 which expands outwardly into the groove 196 and yieldingly connects the two rings.

The sides of the groove 196 flare inwardly, and as the synchronizing ring 172 is engaged, for example, with the conical surface of the member 183 in the movement of the ring 174 to the left (Figure 1), continued movement of the member 174 in this direction will cause the right hand side of the groove 196 to force the garter spring 190 inwardly into the groove 195 and from the groove 196 so that the member 174 may continue its movement to engage the clutch teeth 172 with the clutch teeth 182 without further movement of the synchronizing ring 170. In shifting into low ratio drive, the action of the garter spring against the opposite side of the groove 196 is the same. Figure 2 shows the position of the parts after the gear 164 has been synchronized with the ring 170, and the clutch teeth 172 engaged with the clutch teeth 182 for reverse drive. Figure 3 shows the position of the parts after the member 180 and low ratio gear 136 have been synchronzied with the ring 170 and the clutch teeth 172 moved into engagement with clutch teeth 192 for low ratio drive. It is to be understood that the synchronizing and clutching means for overdrive and direct drive have a neutral position, as shown in Figure 1.

The second ratio gear 130 is provided rearwardly of its external teeth with integral clutch teeth 200, and rearwardly of these teeth 200 is a synchronizing sleeve 201 riveted at 202 upon the tubular rearward end of gear 130. A ring 203 is splined at 204 upon countershaft 132, and a synchronizing ring 205 is slidably splined at 206 upon ring 203. The ring 205 has external clutch teeth 207 which engage slidingly with internal clutch teeth 208 in the positive clutching ring 209 for low ratio drive. This ring 209 has clutch teeth 210 for engagement with clutch teeth 200 when ring 209 is shifted to the left from neutral position, as shown in Figure 1, and ring 205 has an internal conical clutch surface 211 for synchronizing engagement with external conical surface of sleeve 201 for synchronizing gear 130 with respect to ring 205 ahead of positive clutching engagement of ring 209 with clutch teeth 200.

A coiled garter spring 215 yieldingly connects the synchronizing ring 205 to the clutching ring 209, so that the ring 205 will move yieldingly with the ring 209, and, after the two parts 130 and 205 are synchronized by engagement of the clutch surface 210 with the synchronizing sleeve 201, permits the ring 209 to move on past ring 205 for engagement of the clutch teeth 210 with the clutch teeth 200 for low ratio drive. When the ring 205 is out of synchronizing engagement with the sleeve 201, there may be a slight clearance between the cooperating conical surfaces.

The garter spring 215 is similar to the garter spring 195. This spring encircles the synchronizing ring 205 and lies in an annular groove 216 formed about the teeth 207. The sides of the groove 216 flare outwardly, and the clutching ring 209 has an internal groove 218 to receive the outer portion of the garter spring which yieldingly connects the two parts, as shown in Figure 1. As the synchronizing ring 205 is engaged with the conical surface of the sleeve 201 in the movement of the ring 209 to the left (Figure 1), continued movement of the member 209 in this direction will cause the left hand side of the groove 216 to expand garter spring 215 outwardly into groove 218 in ring 209 and from the groove 216, so that the member 209 may continue its movement to engage the clutch teeth 210 with clutch teeth 200 without further movement of synchronizing ring 205. Figure 4 shows the position of the parts after the gear 130 has been synchronized with respect to the ring 205 and clutch teeth 210 engaged with clutch teeth 200 to connect gear 130 positively to countershaft 132.

The ring 209 has a groove 220 for engagement by a shifter fork 221 (Figure 7) for second ratio drive. This shifter fork may be operated from the same shift lever which operates the synchronizing and clutching devices for the other gears, or otherwise as desired. The gears 14 and 130 may be provided with lateral oil feeding ducts, indicated at 225 in Figure 1.

It is believed that the operation of the device will be apparent from the foregoing description. With the parts in the position shown in Figure 1, the transmission is in neutral. In order to obtain low ratio drive, the ring 174 is shifted rearwardly. This rearward movement of the ring 174 moves the synchronizing ring 170 with it until the low ratio gear 136 is synchronized with respect to the countershaft 132, whereupon the internal teeth of the ring 174 engages the teeth 192 and positively connects the gear 136 to the countershaft. The drive is then transmitted from drive shaft 6 through meshing gears 40 and 162, countershaft 132 and meshing gears 136 and 10, to drive the driven shaft 9 at low speed. Second ratio is obtained by shifting ring 209 forwardly, the engagement of the friction surface 210 of the ring 205 with the cooperating friction surface of the sleeve 201 first synchronizing the gear 130 with respect to the countershaft, whereupon the internal clutch teeth 210 move into positive clutching engagement with the teeth 200. Second ratio drive is then transmitted from the drive shaft 6 through the gears 40 and 162, countershaft 132, and meshing gears 130 and 14, to the driven shaft 9.

In order to obtain direct drive, the clutching ring 82 is shifted rearwardly, the cooperating friction surfaces first synchronizing the ring 82 with respect to the direct drive member 68, whereupon the internal clutch teeth 81 are moved into positive clutching engagement with the clutch teeth 80. Direct drive is then transmitted from the drive shaft 6 through the direct drive member 68, clutching ring 82, and gear 10, to the driven shaft 9. Internal gear overdrive is obtained by shifting the ring 82 forwardly from the position shown, the cooperating friction surfaces first synchronizing this ring with respect to the overdrive member 62, whereupon the internal clutch teeth 81 are positively engaged with the clutch teeth 84. Internal gear overdrive is then transmitted from the drive shaft 6 through the internal gear teeth 53, and the meshing external teeth of composite gear 55, and thence through the internal teeth of the composite gear and the meshing external teeth of the overdrive member 62, to the clutching ring 82, and through the low ratio gear 10 to the driven shaft 9.

The transmission may be lubricated by an oil bath (not shown) within the case 5, and a drain plug may be provided at the bottom as shown at 230. By providing the clutches for low, second and reverse on the countershaft, these clutches may run in the oil bath, thereby assuring ample lubrication to the synchronizing clutches at all times. Furthermore, as already pointed out, by providing the clutches for low, second and reverse on the countershaft, it is possible to make these clutches a great deal smaller and to have the same synchronizing ability as clutches two or three times larger mounted on the main shaft. Synchronizing clutches are provided on all ratios, thereby eliminating the usual necessity of shifting gear teeth of one gear into the gear teeth of another, and eliminating the clashing of gear teeth and making it possible to use helical teeth throughout.

The absence of shifting gears along the main shaft and the provision of but one shiftable synchronizing and clutching device for direct drive and overdrive along the main shaft with the synchronizing and clutching devices for low ratio, second ratio, and reverse, along the countershaft, provides a transmission with overdrive incorporated which is considerably shorter than the conventional transmission having only three speeds where the same gear tooth is used. The use of an overdrive in the transmission, as heretofore, usually meant considerably added length, which I avoid, and the liability to weaving or distortion is reduced.

Figure 8:
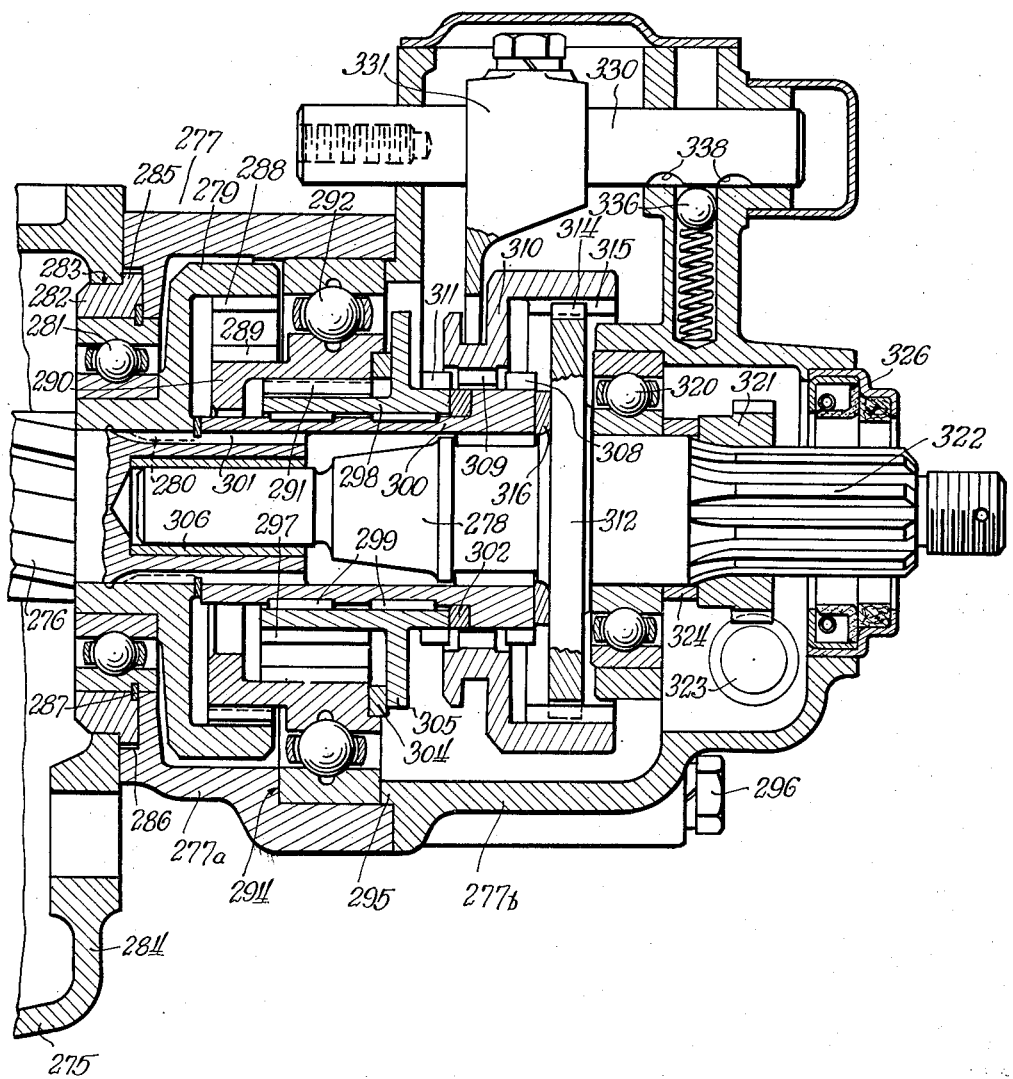
Figure 8 is a longitudinal sectional view of another form of transmission of my invention.

The device shown in Figure 8 is an overdrive device for use in connection with the usual accelerating and reverse gear transmission enclosed within the usual case 275. The shaft 276 is the usual driven shaft of the transmission housed within case 5. The rear end of this shaft is reduced, and this reduced end projects into the case 277 for the overdrive device, and has piloted therein the reduced forward end of the driven shaft 278 of the overdrive device. An internal gear 279 is splined at 280 upon the reduced end of shaft 276 and is supported in a bearing 281. The bearing 281, in turn, is supported by a bearing retainer 282 held in the opening 283 in the rear end wall 284 of case 275 and against endwise movement by flange 285 clamped between the two casings 275 and 277. The end of case 277 which abuts case 275 is recessed at 286 to receive flange 285.

The outer race of the bearing 281 is held against endwise movement by a snap ring 287. This ring is held between retainer 282 and case 277 and engages in an annular groove in the outer race of bearing 281. The ring 287 may be split for application to the outer race of bearing 281, and this ring takes the end thrust of the helical teeth in the internal gear drive.

The internal gear 279 has internal helical teeth 288 which mesh with external helical teeth 289 on an external internal or composite gear 290, the opposite end of which is provided with internal helical teeth 291. The external internal gear ring 290 is supported in a bearing 292 mounted in the relatively short forward portion 277a of the case 277. The outer race 293 of bearing 292 is held endwise between a shoulder 294 in forward portion 277a of case 277, and a centering flange 295 integral with the forward end of rear portion 277b of case 277 and fitting telescopically into the rear end of case portion 277a. The rear case portion 277b is clamped to forward case portion 277a by bolts 296, and case 277 is suitably attached to the rear end of case 275.

The internal helical teeth 291 on external internal gear 290 mesh with external helical teeth 297 on an overdrive member 298. This member is preferably mounted on needle-point bearings 299 on tubular direct drive member 300 which extends through overdrive member 298 and external internal gear 290 and is splined at 301 to the reduced end of shaft 276. Interposed between the lateral enlargement at the rear end of direct drive member 300 and the adjacent end of overdrive member 298 is a thrust washer 302, and another thrust washer 304 is interposed between flange 305 of overdrive member 298 and the adjacent end of external internal gear 290. The reduced end of driven shaft 278, which is piloted in the end of shaft 276, may be provided with a suitable bushing as indicated at 306.

The direct drive member 300 is provided peripherally at its right-hand end (Figure 8) with external clutch teeth 308 for engagement with internal clutch teeth 309 on a shiftable clutch ring 310 when this ring is shifted to the right from the neutral position illustrated. These same teeth 309 are adapted to be engaged when ring 310 is shifted to the left (Figure 8) with external clutch teeth 311 on the overdrive member 298.

The driven shaft 278 has an integral flange 312 provided peripherally with external splines 314 which engage internal splines 315 in the right-hand end of clutch ring 310. A thrust washer 316 is preferably interposed between the flange 312 and the adjacent end of direct drive member 300.

The teeth 315 are slidable with respect to the teeth 314 in shifting the member 310, and are of sufficient length for constant engagement with teeth 314 when member 310 is shifted to engage the teeth 309 with the teeth 308 and when said member 310 is shifted in the opposite direction to engage the teeth 309 with the teeth 311. The teeth 315 being larger than the teeth 308 permit the teeth 315 to move telescopically over the teeth 308 in shifting the member 310 to engage teeth 309 with the teeth 311. This is important in that it permits the rear bearing 320 to be brought up close to the direct drive member 300 without interference between teeth 315 and teeth 308. When member 310 is shifted to the left (Figure 8), the teeth 315 move over the teeth 308 clear of the same so that there will be no interference between these parts and, at the same time, the overlapping or telescoping arrangement reduces the overall length of the overdrive device and places the bearing 320 close in to provide firm support for the parts.

The outer race of the bearing 320 is seated in the rear casing portion 277b for the overdrive device. A worm gear 321 housed within the casing part 277b and secured to turn with the driven shaft 278 by means of splines 322 meshes with a worm member 323 for driving the speedometer mechanism of the vehicle in the usual manner. A thrust washer 324 is interposed between the inner race of the bearing 320 and the worm gear 321. The rearward end of casing portion 277b is preferably provided with a fluid-tight oil cap or closure device, indicated more or less diagrammatically and in its entirety at 326. This device seals the rear end of the casing for the overdrive gear device against the escape of lubricant which is maintained at the desired level within the casing. This device, of course, cooperates to this end with the means for connecting the splined end of shaft 278 to the propeller shaft.

The member 310 is shifted in any suitable or desired manner, as by means of a shifter rod 330 slidable in the upper portion of the casing part 277b. The rod 330 has a shifter arm 331 secured thereto, and this arm has suitable shifting engagement or cooperation with an external groove 334 in the member 310. A spring-pressed ball member 336 cooperates with notches 338 to retain rod 330 in the positions in which the clutch teeth 309 are engaged with the teeth 308 and teeth 311.

In the embodiment of the invention illustrated in Figure 1, a snap washer is preferably provided at 400 for the purpose of holding the shaft 6 endwise when the direct drive clutch at 97 is engaged.

I have described the invention in connection with the details of particular devices, but I do not intend thereby to limit the invention to such details, nor do I intend to be limited to the particular relation of the essential features shown and described.

I claim:

1. A gear set for motor vehicles having in combination a driving shaft, a driven shaft, a countershaft, speed change and direct drive means between the driving and driven shafts and arranged on the driven shaft in coaxial relation with respect thereto, meshing gears connecting the drive shaft and countershaft, low ratio and second ratio gears fixed endwise on the driven shaft and against rotation with respect to said driven shaft, low ratio and second ratio gears rotatable freely on the countershaft and in constant meshing engagement with the low ratio and second ratio gears on the driven shaft, a reverse gear rotatable freely on the countershaft and operatively connected with said driven shaft, shiftable means on the countershaft for positively clutching said low ratio and second ratio countershaft gears selectively to said countershaft and for freeing same therefrom, and shiftable clutch means also on the countershaft for positively clutching said reverse gear to said countershaft.

2. A gear set for motor vehicles having in combination, a driving shaft, a driven shaft, a countershaft, overdrive and direct drive means between the driving and driven shafts, meshing gears connecting the drive shaft and countershaft, low ratio and second ratio gears fixed endwise on the driven shaft and against rotation with respect to said driven shaft, low ratio and second ratio gears rotatable freely on the countershaft and in constant meshing engagement with the low ratio and second ratio gears on the driven shaft, a reverse gear rotatable freely on the countershaft, synchronizing surfaces and positive clutch teeth one said low ratio and second ratio countershaft gears and on said reverse gear, a synchronizing ring shiftably splined on the countershaft between said reverse and low ratio countershaft gears and having synchronizing surfaces engageable selectively with the synchronizing surfaces on said reverse and low ratio countershaft gears, a positive clutching ring surrounding and splined shiftably to said synchronizing ring, said positive clutching ring being yieldably connected endwise to said synchronizing ring and having clutch teeth for engagement selectively with the clutch teeth on said reverse and low ratio countershaft gears, a synchronizing ring shiftably splined on the countershaft rearwardly of said second ratio countershaft gear and having a synchronizing surface engageable with the synchronizing surface on said second ratio gear, and a positive clutching ring surrounding and splined shiftably to said last synchronizing ring, said last positive clutching ring being yieldingly connected endwise to said synchronizing ring and having clutch teeth for engagement with the clutch teeth on said second ratio countershaft gear.

3. A gear set for motor vehicles having in combination a driving shaft, a driven shaft, bearing means near one end of said driven shaft and adapted to resist both axial and radial displacement of said driven shaft, a countershaft, meshing gears having helical teeth connecting the drive shaft and countershaft, a ratio gear also having helical teeth and fixed endwise on the driven shaft and against rotation with respect to said driven shaft, a roller bearing on the countershaft taking radial loads only, a ratio gear rotatable freely on said roller bearing and in constant meshing engagement with the ratio gear on the driven shaft, shiftable means on the countershaft for positively clutching said ratio countershaft gear to said countershaft and for freeing same therefrom, a bevel pinion on the driven shaft rearwardly of said ratio gear, and a diagonal take-off shaft having a bevel gear meshing with said bevel pinion, said first mentioned bearing means taking the thrust due to said helical gears and said bevel pinion and bevel gear.

4. A gear set for motor vehicles having in combination a driving shaft, a driven shaft, a countershaft, meshing gears connecting the drive shaft and countershaft, a ratio gear having helical teeth and fixed endwise on the driven shaft and against rotation with respect to said driven shaft, a roller bearing on the countershaft taking radial loads only, a ratio gear also having helical teeth and rotatable freely on said roller bearing and in constant meshing engagement with the ratio gear on the driven shaft, shiftable means on the countershaft for positively clutching said ratio countershaft gear to said countershaft and for freeing same therefrom, a bevel pinion on the driven shaft rearwardly of said ratio gear, a diagonal take-off shaft having a bevel gear meshing with said bevel pinion, a case for said gear set, a roller bearing for the driven shaft taking radial loads only and mounted in the rear wall of said case and between said ratio gear and said bevel pinion, and a bearing for said driven shaft rearwardly of said bevel pinion taking both radial and axial loads.

5. A gear set for motor vehicles having in combination an internal gear, a composite gear having external teeth meshing with the internal teeth of said internal gear, an overdrive member having external teeth meshing with the internal teeth on said composite gear, a driving shaft fixed to said internal gear and extending through said internal gear, said composite gear and said overdrive member, a direct drive member on the extending end of said driving shaft, a coaxial driven shaft, a low ratio gear fixed on the driven shaft and having external teeth and internal splines inside and aligned with said external teeth, a clutching ring having constant splined engagement with the internal splines on said low ratio gear and shiftable into clutching engagement with said overdrive and direct drive members, a second ratio gear fixed endwise and against rotation with respect to said driven shaft, a countershaft, meshing gears connecting the driven shaft and countershaft, low ratio and second ratio gears rotatable freely on the countershaft and in constant meshing engagement with the low ratio and second ratio gears on the driven shaft, and shiftable means on the countershaft for positively clutching said low ratio and second ratio countershaft gears to the countershaft and for freeing same therefrom.

6. A gear set for motor vehicles having in combination an internal gear, a composite gear having external teeth meshing with the internal teeth of said internal gear, an overdrive member having external teeth meshing with the internal teeth on said composite gear, a driving shaft fixed to said internal gear and extending through said internal gear, said composite gear and said overdrive member, a direct drive member on the extending end of said driving shaft, a coaxial driven shaft, a low ratio gear fixed on the driven shaft and having external teeth and internal splines inside and aligned with said external teeth, a clutching ring having constant splined engagement with the internal splines on said low ratio gear and shiftable into clutch engagement with said overdrive and direct drive members, a second ratio gear fixed against rotation with respect to said driven shaft, a countershaft, meshing gears connecting the driving shaft and countershaft, low ratio and second ratio gears rotatable freely on the countershaft and in constant meshing engagement with the low ratio and second ratio gears on the driven shaft, a reverse gear also rotatable freely on said countershaft, separate shiftable means on the countershaft for positively clutching said low ratio and second ratio countershaft gears to the countershaft, and shiftable means also on the countershaft for positively clutching said reverse countershaft gear to the countershaft.

7. In combination, a driving shaft, a driven shaft, a low ratio gear fixed on the driven shaft and having external teeth and internal splines inside and aligned with said teeth, internal gear overdrive and direct drive means between the driving shaft and driven shaft and including a shiftable clutch ring having external teeth in constant splined engagement with the internal splines on said low ratio gear and a set of internal teeth, an external gear mounted for rotation on said driving shaft and having a radially outwardly extending periphery with a set of teeth adapted to be engaged with said internal teeth, a composite gear having external teeth and internal teeth meshing with the external teeth of said external gear, and a gear member fixed to said driving shaft and having sets of internal and external gear teeth, the external teeth of said composite gear meshing with the internal teeth of said gear member, and means for driving said low ratio gear on the driven shaft from the external teeth on said gear member.

8. In combination, a relatively short gear case having a front wall and a rear wall, a driven shaft journaled in said rear wall, a driving shaft journaled in said front wall and extending into proximity to said rear wall and piloted in said driven shaft, a bearing cap secured to the rear wall of said case and having aligning means cooperating with said case, a countershaft, a ratio gear rotatable freely on said countershaft, synchronizing and positive clutch means on the countershaft for said ratio gear and in line with the rear wall of said case, and an end thrust bearing for the countershaft and carried by said bearing cap rearwardly of said synchronizing and positive clutch means.

9. A gear set for motor vehicles having, in combination, an internal gear, a driving shaft fixed to said internal gear, a composite gear having external teeth meshing with the internal teeth of said internal gear, an overdrive member having external teeth meshing with the internal teeth on said composite gear, a direct drive member having a tubular portion extending through said overdrive member and said composite gear and fixed to said driving shaft, and a driven shaft extending through said direct drive member and piloted in the driving shaft in line with said internal gear thereon.

10. A gear set for motor vehicles having, in combination, an internal gear, a driving shaft fixed to said internal gear, a composite gear having external teeth meshing with the internal teeth of said internal gear, an overdrive member having external teeth meshing with the internal teeth on said composite gear, a direct drive member having a tubular portion extending through said overdrive member and said composite gear and fixed to said driving shaft, a driven shaft extending through said direct drive member and piloted in the driving shaft in line with said internal gear thereon, needle-point bearings on said driven shaft capable of taking radial loads only for rotatably supporting the adjacent end of the direct drive member thereon, and a thrust ring disposed between the rear end of said direct drive member and said driven shaft.

11. A gear set for motor vehicles having, in combination, an internal gear, a driving shaft fixed to said internal gear, a composite gear having external teeth meshing with the internal teeth of said internal gear, an overdrive member having external teeth meshing with the internal teeth on said composite gear, a direct drive member having a tubular portion extending through said overdrive member and said composite gear and fixed to said driving shaft, a driven shaft extending through said direct drive member and piloted in the driving shaft in line with said internal gear thereon, needle-point bearings on said driven shaft capable of taking radial loads only for rotatably supporting the adjacent end of the direct drive member thereon, needle-point bearings on the tubular portion of said direct drive member capable of taking radial loads only for rotatably supporting the overdrive member thereon, means for transmitting axial thrust from said overdrive member to said direct drive member, and means for transmitting axial thrust from said direct drive member to said driven shaft.

12. A gear set for motor vehicles having, in combination, an internal gear, a driving shaft fixed to said internal gear, a composite gear having external teeth meshing with the internal teeth of said internal gear, an overdrive member having external teeth meshing with the internal teeth on said composite gear and a radially outwardly extending flange, a thrust ring disposed between said flange and the rear face of said composite gear, a set of clutch teeth on said overdrive member rearwardly of said thrust ring, a direct drive member fixed to rotate with said driving shaft and having a set of clutch teeth at the rear end thereof, a thrust ring between the rear face of said direct drive member and said driven shaft, shiftable clutch means disposed between said two sets of clutch teeth and having a splined connection with said driven shaft, a third thrust ring between the rear face of said overdrive member and the forward face of said direct drive member, and bearing means for the rear end of said driven shaft adapted to resist both radial and axial thrusts.

13. A gear set for motor vehicles having, in combination, an internal gear, a driving shaft fixed to said internal gear, a composite gear having external teeth meshing with the internal teeth of said internal gear, an overdrive member having external teeth meshing with the internal teeth on said composite gear and a radially outwardly extending flange, a thrust ring disposed between said flange and the rear face of said composite gear, a set of clutch teeth on said overdrive member rearwardly of said thrust ring, a direct drive member fixed to rotate with said driving shaft and having a set of clutch teeth at the rear end thereof, a thrust ring between the rear face of said direct drive member and said driven shaft, shiftable clutch means disposed between said two sets of clutch teeth and having a splined connection with said driven shaft, and bearing means for the rear end of said driven shaft adapted to resist both radial and axial thrusts.

14. A gear set for motor vehicles having, in combination, an internal gear, a driving shaft fixed to said internal gear, a composite gear having external teeth meshing with the internal teeth of said internal gear, an overdrive member having external teeth meshing with the internal teeth on said composite gear, a thrust bearing disposed between said overdrive member and said composite gear, a direct drive member fixed to rotate with said driving shaft, thrust bearing means between said direct drive member and said overdrive member, thrust bearing means between said driving shaft and said driven shaft, said shafts being telescopically associated in coaxial relation and one of said shafts including a portion extending axially through said internal gear, composite gear, overdrive member, and direct drive member, clutch mechanism adapted to optionally connect said driven shaft with either said overdrive member or said direct drive member, and bearing means for the rear end of said driven shaft adapted to resist both radial and axial thrusts.

THOMAS L. FAWICK.